US009425476B2

(12) United States Patent
Lee et al.

(10) Patent No.: US 9,425,476 B2
(45) Date of Patent: Aug. 23, 2016

(54) MANUFACTURE METHOD OF MEMBRANE ELECTRODE ASSEMBLY FOR FUEL CELL

(71) Applicant: Hyundai Motor Company, Seoul (KR)

(72) Inventors: Jae Seung Lee, Gyeonggi-do (KR); Dae Yong Son, Gyeonggi-do (KR); Ki Sub Lee, Gyeonggi-do (KR); Min Jin Kim, Seoul (KR); Young Min Kim, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/533,736

(22) Filed: Nov. 5, 2014

(65) Prior Publication Data

US 2015/0180072 A1 Jun. 25, 2015

(30) Foreign Application Priority Data

Dec. 19, 2013 (KR) ........................ 10-2013-0158990

(51) Int. Cl.

| | |
|---|---|
| ***B32B 37/00*** | (2006.01) |
| ***H01M 8/10*** | (2016.01) |
| ***B32B 37/06*** | (2006.01) |
| ***B32B 37/10*** | (2006.01) |
| ***B32B 37/18*** | (2006.01) |
| ***B32B 38/00*** | (2006.01) |
| ***B32B 29/00*** | (2006.01) |

(52) U.S. Cl.

CPC ............... *H01M 8/10* (2013.01); *B32B 29/002* (2013.01); *B32B 37/025* (2013.01); *B32B 37/06* (2013.01); *B32B 37/10* (2013.01); *B32B 37/18* (2013.01); *B32B 38/004* (2013.01); *B32B 2255/12* (2013.01); *B32B 2255/26* (2013.01); *B32B 2307/748* (2013.01); *B32B 2309/02* (2013.01); *B32B 2309/04* (2013.01); *B32B 2309/12* (2013.01); *B32B 2457/00* (2013.01); *B32B 2457/18* (2013.01)

(58) Field of Classification Search

CPC ... H01M 8/1002; H01M 8/1004; H01M 8/10; H01M 8/2404; B32B 37/06; B32B 37/26; B32B 2037/268; B32B 38/004; B32B 38/0036; B32B 2038/0048; B29C 66/0044; B29C 66/0344

USPC ............. 156/307.1, 307.7, 323; 429/483, 535

See application file for complete search history.

(56) References Cited

U.S. PATENT DOCUMENTS 3,860,541 A * 1/1975 Lehmann ............. C08G 59/184 428/417
7,981,572 B2 * 7/2011 Fujiki ................. H01M 8/0271 429/400

(Continued)

FOREIGN PATENT DOCUMENTS

JP 2003-036862 A 2/2003
JP 2004-119065 A 4/2004

(Continued)

*Primary Examiner* — John Goff

(74) *Attorney, Agent, or Firm* — Mintz Levin Cohn Ferris Glovsky and Popeo, P.C.; Peter F. Corless

(57) ABSTRACT

A manufacturing system and method of an membrane electrode assembly (MEA) for a fuel cell is provided which increases performance and durability of an MEA and ensures productivity of the MEA therein. In particular, electrodes and an electrolyte membrane are bonded together and the membrane electrode assembly manufactured in the bonding process is pressed at a predetermined temperature.

13 Claims, 4 Drawing Sheets

(56) References Cited

U.S. PATENT DOCUMENTS

2008/0178991 A1 7/2008 Mah et al.
2010/0051181 A1* 3/2010 Mori .................. H01M 4/8814 156/184
2010/0279196 A1* 11/2010 Kim .................. H01M 8/1004 429/483
2011/0217621 A1* 9/2011 Felix .................. H01M 4/8605 429/492
2013/0192750 A1* 8/2013 Kiuchi ................ H01M 4/8814 156/247

FOREIGN PATENT DOCUMENTS

JP 2010-067493 A 3/2010
JP 2010-205527 A 9/2010
KR 10-2002-0084217 11/2002
KR 10-2003-0011765 A 2/2003
KR 10-2009-0043765 A 5/2009

* cited by examiner

MANUFACTURE METHOD OF MEMBRANE ELECTRODE ASSEMBLY FOR FUEL CELL

CROSS-REFERENCE TO RELATED APPLICATION

This application claims under 35 U.S.C. §119(a) the benefit of Korean Patent Application 10-2013-0158990 filed Dec. 19, 2013, the entire contents of which are incorporated herein by reference.

BACKGROUND (a) Technical Field

The present disclosure relates to a manufacturing method of a membrane electrode assembly (MEA) for a fuel cell, and more particularly to a method of manufacturing an MEA for a fuel cell which increases performance and durability of an MEA and ensures productivity of the MEA.

(b) Background Art

In general, the membrane electrode assembly (MEA) of fuel cells is composed of two electrodes (i.e., an anode and cathode) and an electrolyte membrane. In general, it is understood by those skilled in the art that the better the bonding at the interfaces between the electrolyte membrane and each of the electrodes, the higher the performance and the durability in most cases.

Conventionally, electrodes (i.e., the catalyst layer) are formed by coating, spraying, or painting catalyst slurry onto a gas diffusion layer, and then heat-compressing the electrodes with a polymer electrolyte membrane, a by coating, spraying, or painting catalyst slurry directly onto a polymer electrolyte membrane, and/or by coating, spraying, or painting catalyst slurry onto a release paper, and then heat-compressing the release paper having the electrodes with a polymer electrolyte membrane and removing the release paper.

As in the method described first above, manufacturing electrodes (catalyst layer) by coating catalyst slurry on a gas diffusion layer is advantageous in forming of pores in the electrodes. However, this manufacturing process is inconvenient to execute, so this process is not used in the manufacture of membrane electrode assembly typically.

Furthermore, in the second method, when electrodes (catalyst layer) are formed directly on a polymer electrolyte membrane, it is possible to manufacture small electrodes, but it is difficult to manufacture electrodes with large areas due to the amount of deformation of the polymer electrolyte membrane that occurs on the larger scales.

However, by coating a catalytic layer (electrodes) on a release paper and transferring the release paper (release paper coated with the catalytic layer) to a polymer electrolyte membrane, electrodes can be easily coated in desired shapes on a release paper and mass production is possible.

There are also many methods of coating a release paper with electrodes. For example, some of these methods include bar coating, comma coating, slot die coating, gravure coating, and spray coating.

Bar coating and spray coating, which are method used for manufacturing a small number of electrodes, are difficult to use for mass production processes. As such, these methods are only used by smaller industry. Comma coating and gravure coating are also difficult to use for mass production processes because they are difficult to control the dimensions of electrodes and the property of the catalyst slurry easily changes.

Slot die coating, however, easily controls the dimension of electrodes and maintains the properties of catalyst slurry because the catalyst slurry is coated in a closed-loop system. Additionally, in this process, the process can continuously coat electrodes having the same dimensions while coating electrodes (catalyst layer) in predetermined directions.

Two currently, known methods of transferring electrodes coated on a release paper to an electrolyte membrane are plate hot pressing and roll pressing. Plate hot pressing transfers electrodes onto an electrolyte membrane generally by pressing them at a temperature of 100° C.-200° C. under a pressure of 5~50 $kgf/cm^2$ for 1~10 minutes.

FIG. 1 shows an electrode-membrane bonding process in plate pressing that transfers electrodes coated on release papers to an electrolyte membrane. As shown in FIG. 1, plate pressing transfers two electrodes 4 and 5 coated on release papers 2 and 3, respectively, in a hot press 1 to both sides an electrolyte membrane 6 by pressing the electrodes 4 and 5 with the electrolyte membrane 6 therebetween.

In plate pressing, however, although the interfacial adhesion is sufficient between the electrodes and the electrolyte membrane, the processing speed is slow and mass production is difficult because it takes to long to press the electrodes and an electrolyte membrane for manufacturing a single membrane electrode assembly.

Roll pressing, on the other hand, transfers electrodes onto an electrolyte membrane by heat-compressing them at a temperature of 80° C.-200° C. at a speed of 0.1~2.0 m/min under a pressure of 1~40 $kgf/cm^2$. FIG. 2 shows roll pressing that can continuously perform electrode-membrane bonding, with electrodes, which are continuously coated on release papers, by being put in a roll pressing apparatus. As shown in FIG. 2, according to roll pressing, it is possible to continuously manufacture membrane electrode assemblies 16 by continuously transferring electrodes 11 and 13 to electrolyte membranes 15 by bonding release papers 12 and 14 coated with the electrodes 11 and 13 and the electrolyte membranes 15 through a roll press 110.

Although roll pressing in that mass production is easy, the interfacial adhesion is not sufficient between the electrodes and the electrolyte membranes, the continuous bonding process for electrode membrane assemblies does not provide for sufficient adhesion during the high speed process.

In most electrode membrane assemblies, the better the bonding at the interfaces between the electrolyte membrane and each of the electrodes, the higher the performance and the durability. However, when there is separation at the interfaces between the electrodes and the membrane, the performance is reduced, and the separation increases therebetween when the assemblies are operated for a long period of time. As a result, the entire performance of the system rapidly reduces.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a method of manufacturing a membrane electrode assembly for a fuel cell which improves interfacial adhesion between electrodes and electrolyte membranes while continuously manufacturing electrode membrane assemblies by continuously supplying and bonding electrodes and electrolyte membranes, and then applying heat treatment by pressing the manufactured electrode membrane assemblies at a high temperature.

An embodiment of the present disclosure provides a method of manufacturing a membrane electrode assembly for a fuel cell, which includes: a bonding process that includes bonding electrodes and an electrolyte membrane and applying a heat treatment process that presses the membrane electrode assembly manufactured in the bonding process, at a given temperature.

In particular, in some exemplary embodiments of the present invention, the bonding process may be a roll pressing process, and in detail, membrane electrode assemblies may be continuously manufactured by bonding release papers continuously coated with electrodes with regular intervals and an electrolyte membrane.

Interfacial adhesion between electrodes and an electrolyte membrane may be increased by pressing a membrane electrode assembly through hot pressing process, in the heat treatment process, and in detail, several sheets of membrane electrode assemblies may be vertically stacked and the interfacial adhesion between electrodes and an electrolyte membrane of each of the membrane electrode assemblies may be increased by simultaneously pressing the membrane electrode assemblies at a given temperature.

Furthermore, a protection paper may be inserted in between a hot press and a membrane electrode assembly and between vertically stacked membrane electrode assemblies, in the heat treatment process. More specifically, the protection paper may be embodied as a film made of any one selected from polyethylene terephthalate (PET), polyethylene (PE), polypropylene (PP), polyvinyl chloride (PVC), polyethylene naphthalate (PEN), polytetrafluoroethylene (PTFE), and glassy fiber, with polytetrafluoroethylene (PTFE) or silicon may be used, or film formed by coating the film with polytetrafluoroethylene (PTFE) or silicon may be used.

A membrane electrode assembly may be pressed under pressure of 0.5 $kgf/cm^2$~500 $kgf/cm^2$ at temperature of 50° C.~300° C. for 10~300 seconds in some exemplary embodiments of the present invention. In other exemplary embodiments of the present invention, a membrane electrode assembly may be pressed under pressure of 1 $kgf/cm^2$~100 $kgf/cm^2$ at a temperature of 150° C.~250° C. for 30~600 seconds.

According to the present disclosure since heat treatment is applied to membrane electrode assemblies, which are manufactured by roll pressing, the interfacial adhesion between electrodes and an electrolyte membrane can be increased. Therefore, it is possible to continuously manufacture membrane electrolyte assemblies with excellent performance and durability and it is also possible to ensure productivity for mass production.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
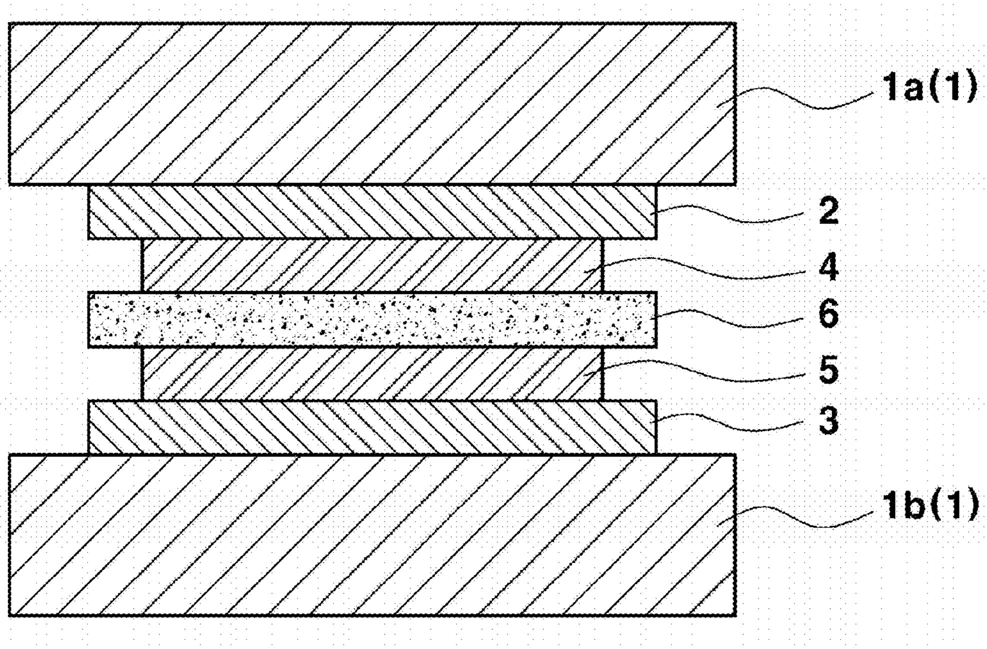
FIG. 1 shows an electrode-membrane bonding process in plate pressing that transfers electrodes coated on release papers to an electrolyte membrane in the related art.

11, 13: electrode
12, 14: release paper
15: electrolyte membrane
16, 16-1, 16-2: membrane electrode assembly (MEA)
17: protection paper
110: roll press
130: hot press It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Examples

Hereinafter, the present disclosure will be described for those skilled in the art to easily achieve it.

As stated above, since the process of the electrode-membrane bonding according to plate pressing of the related art takes too long time, it is not suitable for mass production, and the interfacial adhesion between the electrodes and the electrolyte membrane is not sufficient in roll pressing, the present invention provides a manufacturing method in which membrane electrode assemblies may be quickly mass produced while still providing sufficient interfacial adhesion between the electrodes and the electrolyte membrane.

Therefore, the present disclosure improves physical properties of a membrane electrode assembly (hereafter, referred to as an MEA) by increasing interfacial adhesion between electrodes and electrolyte membranes while continuously manufacturing electrode membrane assemblies. This is done by bonding electrodes and electrolyte membranes through roll pressing, and then applying heat treatment that presses the manufactured electrode membrane assemblies through hot pressing.

When electrodes and an electrolyte membrane are bonded by roll pressing, the characteristics in transfer of an electrode coated on a release paper to an electrolyte membrane depend on the following factors.

①Kind and thickness of release paper, ②Composition and thickness of electrode, ③Radius of the roll press, ④Temperature of the roll press, ⑤Operation speed of the roll press, and ⑥Pressure of the roll press As known in the art, when release papers coated with electrodes and an electrolyte membrane are simultaneously supplied into a roll pressing apparatus, the electrodes and the electrolyte membrane are bonded while the release papers and the electrolyte membrane pass between the roll presses, such that an MEA is formed.

Figure 2:
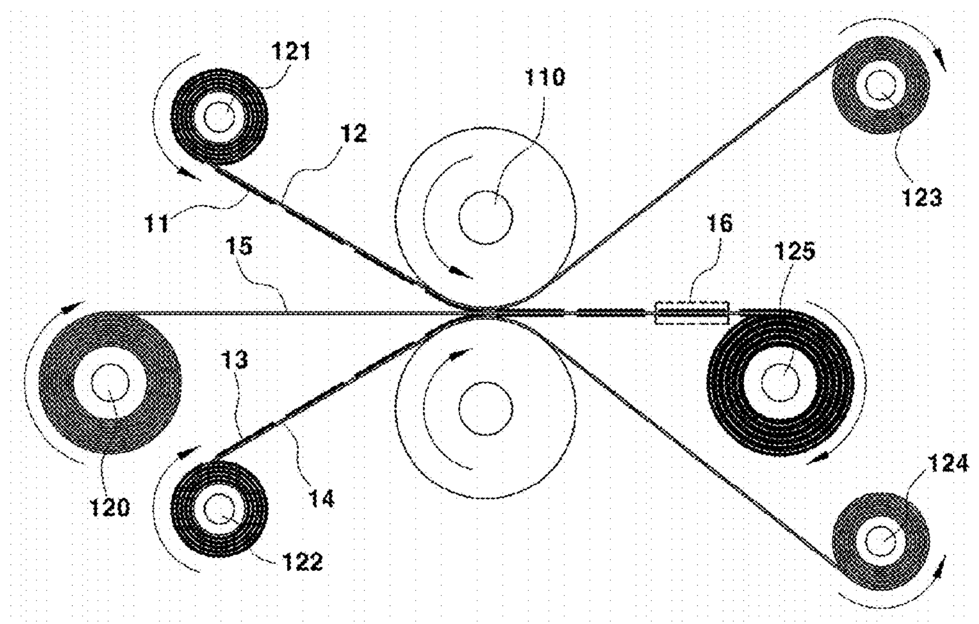
FIG. 2 shows roll pressing that can continuously perform electrode-membrane bonding, with electrodes, which are continuously coated on release papers, put in a roll pressing apparatus.

In detail, referring to FIG. 2, the roll pressing apparatus includes a roll press 110 that transfers electrodes 11 and 13 by pressing release papers 12 and 14 and an electrolyte membranes 15, a center roller 120 that supplies the electrolyte membrane 15 to the roll press 110, a first roller 121 that supplies the release papers 12 and 14 coated with the electrodes 11 and 13 to the roll press 110 from above the center roller 120, and a second roller 122 that supplies the release papers 12 and 14 coated with the electrodes 11 and 13 to the roll press 110 from under the center roller 120.

In the roll pressing apparatus, when the release papers 12 and 14 coated with the electrodes 11 and 13 and the electrolyte membrane 15 are simultaneously supplied to the roll press 110, the electrodes 11 and 13 and the electrolyte membrane 15 are bonded by the roll press 110 pressing the release papers 12 and 14 and the electrolyte membrane 15, such that electrode membrane assemblies 16 with the electrodes 11 and 13 transferred on both sides are continuously manufactured.

The release papers 12 and 14 are continuously coated with the electrodes 11 and 13 with regular intervals, respectively, on a side, so the electrodes 11 and 13 are continuously supplied, as the release papers 12 and 14 are supplied to the roll press 110. The electrode membrane assemblies 16 manufactured through the roll press 110, which are electrolyte membranes with electrodes continuously formed with regular intervals on both sides, are wound and kept around a fifth roller 125 opposite to the center roller 120 with the roll press 110 therebetween, and thereafter, the electrode membrane assemblies 16 having the same size with predetermined dimensions are obtained through cutting.

Further, the release papers 12 and 14 are wound around a third roller 123 and a fourth roller 124 opposite to the first roller 121 and the second roller 122 with the roll press 110 therebetween, such that the electrodes 11 and 13 and the release papers 12 and 14 are separated simultaneously with bonding of the electrodes 11 and 13 and the electrolyte membrane 15.

Figure 3:
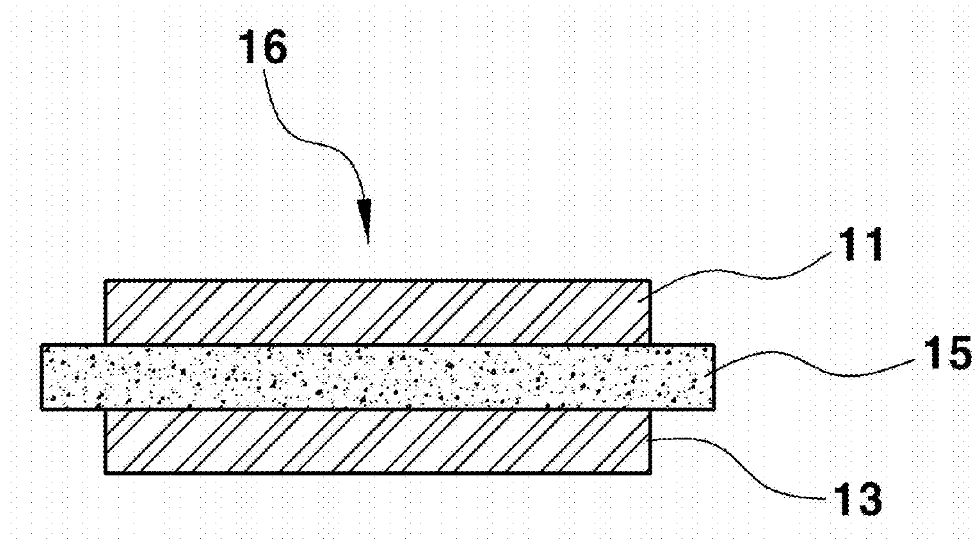
FIG. 3 schematically shows a cross-sectional structure of a membrane electrode assembly for a fuel cell in relation to the exemplary embodiment of the present invention.

The MEA 16 composed of two electrodes (anode and cathode) on both sides and the electrolyte membrane 15, as in FIG. 3, is manufactured by removing the release papers 12 and 14 simultaneously while transferring the electrodes 11 and 13 on the electrolyte membrane 15 by bonding the electrodes 11 and 13 and the electrolyte membrane 15 by pressing the electrodes and the electrolyte membrane between the rolls 110.

However, MEAs 16 produced via the above described manufacturing method has low mechanical strength and are difficult to handle. As a result, the MEA is finished generally by bonding a sub-gasket (not shown) to the outer sides of the electrodes to increase the mechanical strength.

Further, the interfacial strength between the electrodes and the electrolyte membrane of the MEA manufactured by roll pressing is less than that of the MEA manufactured by plate pressing of the related art. As a result, separation between the electrodes and the electrodes and the electrolyte membrane may occur due to insufficient mechanical properties.

In order to eliminate this separation problem, that is, to improve interfacial adhesion and prevent separation between electrodes and an electrolyte membrane, in the present disclosure provides a method of manufacture in which the interfacial adhesion between electrodes and an electrolyte membrane is increased and the mechanical properties of an MEA are improved by applying heat treatment of high-temperature pressing, after continuously manufacturing MEAs through the electrode-membrane bonding process of roll pressing.

Figure 4:
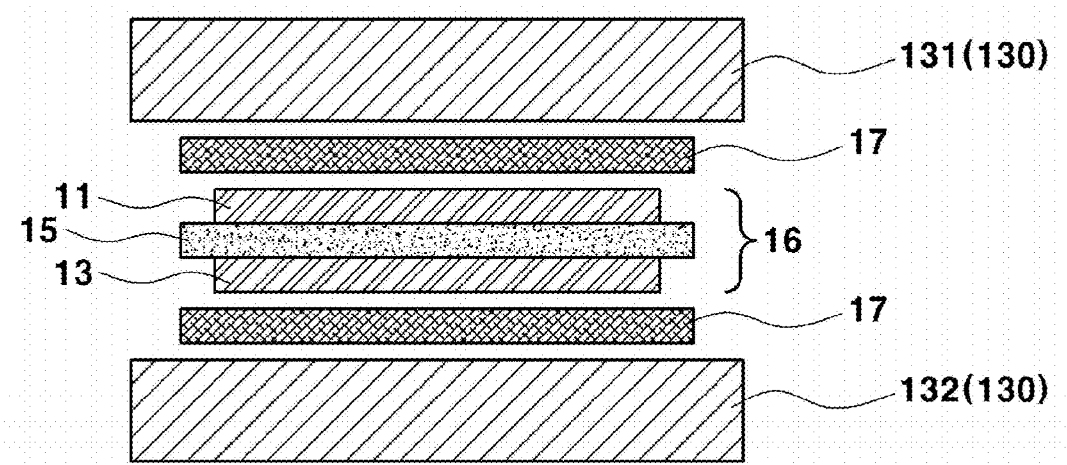
FIG. 4 is a schematic diagram illustrating a heat treatment process on a membrane electrode assembly manufactured through an electrode-membrane bonding process in the method of manufacturing a membrane electrode assembly for a fuel cell according to the exemplary embodiments of the present invention.

FIG. 4 is a schematic diagram illustrating a heat treatment process on an MEA produced by an electrode-membrane bonding process. Referring to FIG. 4, in the heat treatment process on an MEA, the MEA 16 is put into a high-temperature high pressure (plate press) 130 composed of a top plate 131 and a bottom plate 132 and then the interfaces of the electrodes 11 and 13 and the electrolyte membrane 15 are bonded by pressing the MEA 16 under a predetermined pressure from above and beneath the MEA 16.

That is, the top plate 131 and the bottom plate 132 of the high-temperature hot press 130 are disposed above and beneath the MEA 16 and press the MEA 16 at a high temperature and high pressure, thereby performing heat treatment.

Since the surfaces of the MEA 16 may be damaged or contaminated, when the high-temperature top plate 131 and bottom plate 132 are brought in direct contact with the MEA 16, protection papers (inter-papers) 17 are used between the MEA 16 and the hot press 130 to prevent damage to the surface of the MEA 16.

That is, the protection papers 17 are inserted in between the top and bottom of the MEA 16 and the hot press 130 to prevent damage to the MEA and uniformly transmit heat and pressure to the MEA. The kind of the protection paper 17 that can perform this function will be described below.

Figure 5:
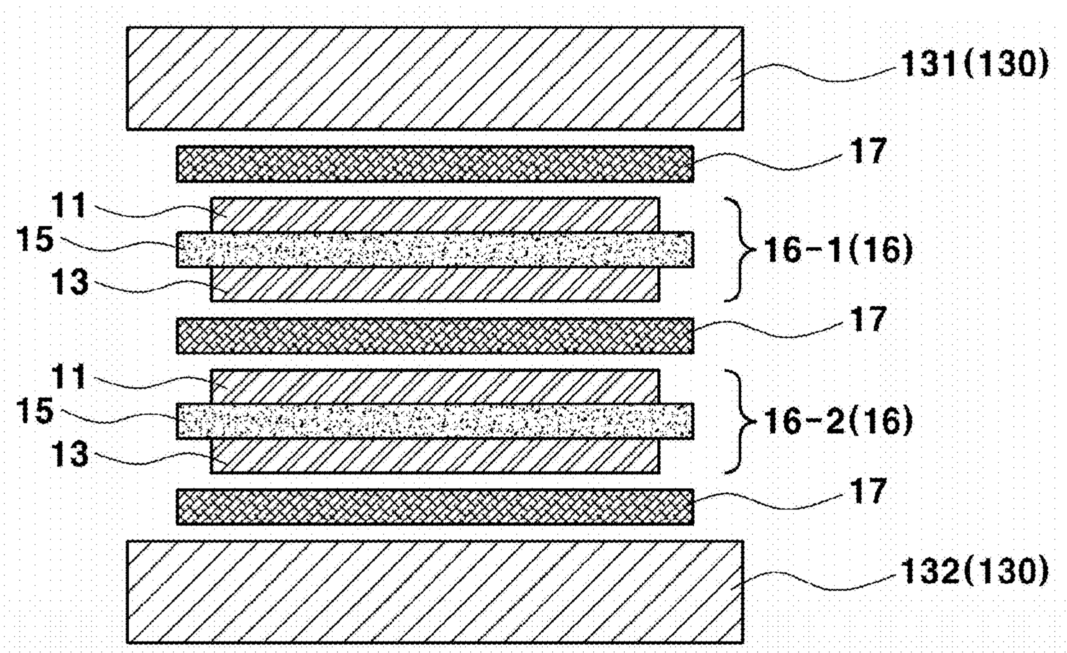
FIG. 5 is a schematic diagram illustrating a heat treatment process of simultaneously pressing several sheets of membrane electrode assemblies in a primary heat treatment process on a membrane electrode assembly in the method of manufacturing a membrane electrode assembly for a fuel cell according to the exemplary embodiments of the present invention.

FIG. 5 is a schematic diagram illustrating a method of simultaneously applying heat treatment to several sheets of MEAs in a primary heat treatment process. According to the present disclosure, it is possible to stack several sheets of MEAs (e.g. ten to hundreds of sheets) and simultaneously apply heat treatment to all of them for mass production after they have been assembled in a roll press process.

As shown in FIG. 5, several sheets of MEAs 16 are stacked between the top plate 131 and the bottom plate 132 of the hot press 130, protection papers 17 are inserted between the MEAs 16 and the hot press 130 and an MEA 16-1 and another MEA 16-2, and the stacked MEAs 16 are bonded by being simultaneously pressed by the high-temperature top plate 131 and bottom plate 132, such that the interfacial adhesion between the electrodes 11 and 13 and the electrolyte membrane 15 of each of the MEAs 16 is increased. As such, the protection paper 17 may uniformly apply pressure to the electrodes 11 and 13 and prevents damage to the MEA 16.

When electrodes and an electrolyte membrane are bonded by plate pressing of the related art, only one sheet of MEA can be manufactured in a primary pressing process in order to transfer electrodes coated on release papers to an electrolyte membrane. That is, an MEA is manufactured by stacking and pressing three sheets of film, that is, a release paper coated with an anode, an electrolyte membrane, and a release paper coated with a cathode, and then by separating the release papers with the anode and the cathode. Accordingly, when several sheets are stacked to manufacture an MEA in the conventional plate pressing process, the electrodes are not uniformly transferred to the electrolyte membrane, and when high pressure is applied to solve this problem, the pores of the electrodes are clogged, so the performance of the fuel cell may be deteriorated.

In comparison with the electrode-membrane bonding process of plate pressing of the related art which manufactures one sheet of MEA at a time, several MEAs may be continuously manufactured in the exemplary embodiment of the present invention by continuously performing the electrode-membrane bonding process through roll pressing and simultaneously applying heat treatment to a set of several MEAs at a time, such that it is possible to achieve the advantages of high speed of the entire process and high productivity.

Appropriate temperature, pressure, and time are required to increase the interfacial adhesion between the electrodes and the electrolyte membranes in the high-temperature heat treatment process, in which the protection papers 17 are inserted in between the MEAs 16 stacked in the hot pressure, as in FIGS. 4 and 5, to suppress a change in dimension of the MEAs and prevent damage to the MEAs from, e.g., dust.

Because the amount of dimensional change and the thermal conductivity of the MEAs depend on the kind of the protection paper 17 that is used, the protection paper 17 for heat treatment needs to be able to come in close contact with an MEA without deformation at high temperature and to transmit a predetermined pressure to an electrode.

Accordingly, as the protection paper 17 for heat treatment, film made of PET (polyethylene terephthalate), PE (polyethylene), PP (polypropylene), PVC (polyvinyl chloride), PEN (polyethylene naphthalate), PTFE (polytetrafluoroethylene), and glassy fiber can be used and film formed by coating the film with PTFE (polytetrafluoroethylene) or silicon can be used.

In the heat treatment process using the hot press 130, the heat treatment pressure is preferably about 0.5 kgf/cm$^2$ 500 kgf/cm$^2$ and more preferably about 1 kgf/of 100 kgf/cm$^2$. In heat treatment under pressure of about 1 kgf/of or less, the bonding of the interfaces between the electrodes 11 and 13 and the electrolyte membranes 15 is not uniform and the interfacial adhesion may be too weak, while in heat treatment under pressure of about 100 kgf/cm$^2$ or more, the pores of the electrodes 11 and 13 become too small due to compression of thee electrodes 11 and 13. As a result of the small pores, the inflow and outflow of a reactant and a product of the fuel cell may be difficult, so the performance of the fuel cell may be deteriorated.

Further, in the heat treatment process using the hot press 130, the heat treatment temperature is preferably about 50° C.~300° C. and more preferably about 150° C.~250° C. At a temperature of about 150° C. or less, the interfacial adhesion may be weak due to non-uniform bonding of the electrodes 11 and 13 and the electrolyte membrane 15, while at a temperature of about 250° C. or more, the performance and durability of the fuel cell may be decreased due to changes in property of the electrolyte membrane 15 and the binders (i.e., the binders contained in the electrodes 11 and 13).

Further, in the heat treatment process using the hot press 130, the heat treatment time is preferably about 10~3000 seconds and more preferably about 30~600 seconds. For 30 seconds or less, the interfacial adhesion may be too weak due to non-uniform bonding of the electrodes 11 and 13 and the electrolyte membrane 15, while for 600 seconds or more, the performance and durability of the fuel cell may be decreased due to changes in property of the electrolyte membrane 15 and the binders or productivity may be deteriorated due to too long process time.

As described above with reference to FIG. 3, the MEA 16 includes the electrodes (anode and cathode) 11 and 13 and the electrolyte membrane 15. The electrodes 11 and 13 are composed of a catalyst, a binder, and an additive, in which the catalyst is one produced by impregnating platinum of an alloy in a carbon support and the binder is an ionomer of PFSA ((peffluorosulfonic acid) film such as nafion. The additive may be metal oxide or carbon nanofiber which is used as a radical inhibitor.

The electrodes 11 and 13 may be coated at a thickness of about 1~20 μm on the release papers 12 and 14 (see FIG. 2) to be bonded with the electrolyte membrane 15, and as the release papers, film made of PET (polyethylene terephthalate), PE (polyethylene), PP (polypropylene), PVC (polyvinyl chloride), PEN (polyethylene naphthalate), PTFE (polytetrafluoroethylene), and glassy fiber can be used and film formed by coating the film with PTFE (polytetrafluoroethylene) or silicon can be used. The thickness of the release papers is preferably 5~200 μm and more preferably 20~100 μm.

The interfacial adhesion between the electrodes and the electrolyte membrane of the MEA finished with heat treatment after bonding can be measured from the amount of electrodes that remains in the electrolyte membrane in break by elongation, as follows. It is possible to estimate separation due to elongation and break in an MEA by testing three or more sample specimens for each of two or more lots under the conditions of 23±2° C. measurement temperature and 50±5% relative humidity on the basis of ASTM D822 for elongation strength.

In the MEA, the length and width of the electrode elongated to the break point in MD (Machine Direction)/TD (Transverse Direction) or WD (Width Direction)/LD (Length Direction) per lot under the condition of crosshead speed 500 mm/min are measured. Further, it is possible to measure the separation area ratio at the point of time when the electrode is separated from the electrolyte membrane by determining whether the electrode has separated from the electrolyte membrane under MEA break estimation conditions. The separation area ratio is calculated by (separated area of electrode/entire area of electrode)×100.

In order to estimate mechanical properties of the MEA manufactured by the method of the present disclosure, it is possible to compare the interfacial adhesion between the electrodes and the electrolyte membrane from the amount of the electrode that remains in the electrolyte in break due to elongation of MEAs manufactured under different conditions.

Figure 6:
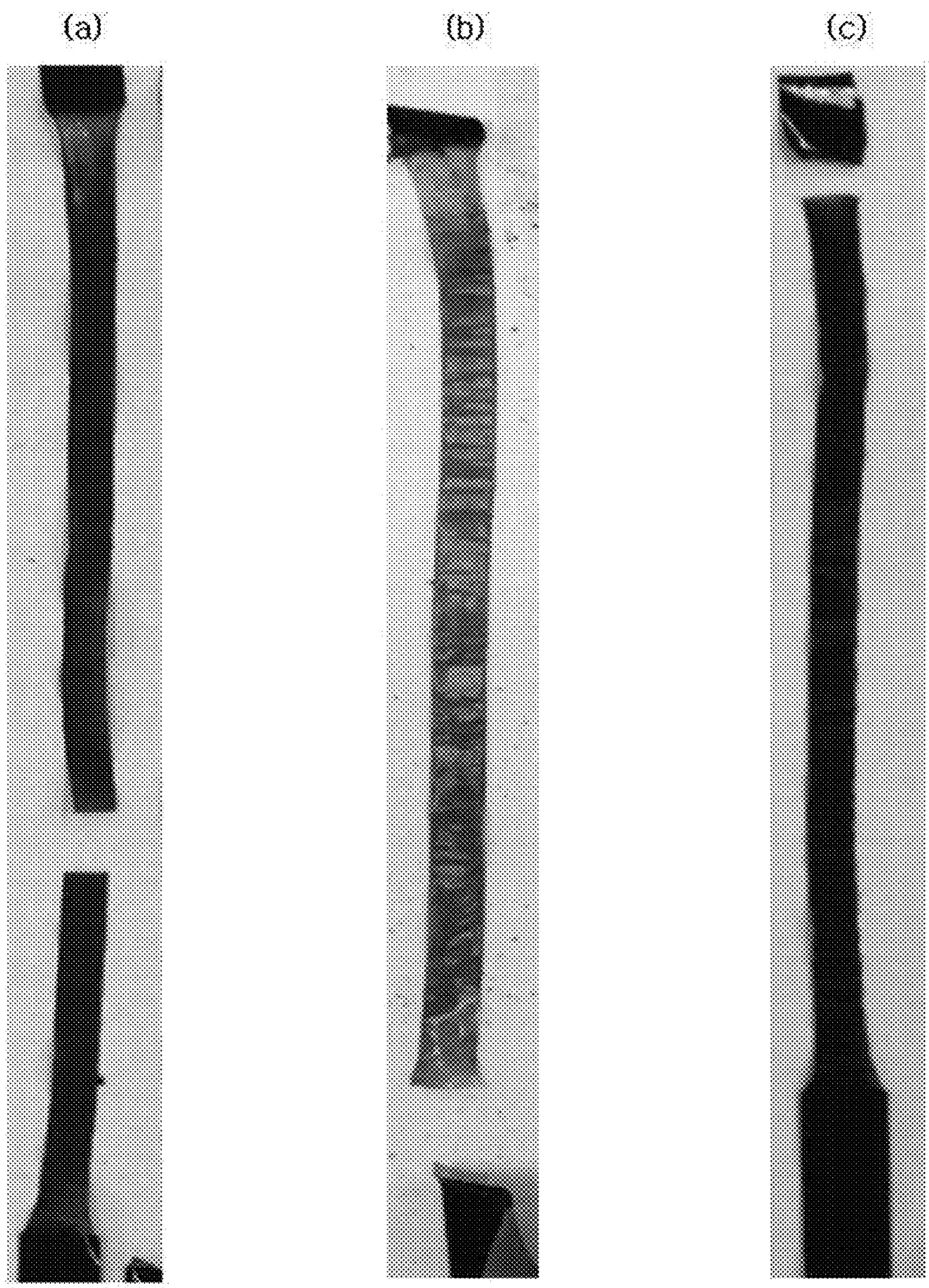
FIG. 6 is a picture showing the result of separation tests on a membrane electrode assembly manufactured under predetermined conditions to check the effects of the method of manufacturing a membrane electrode assembly for a fuel cell according to the exemplary embodiments of the present invention.

FIG. 6 shows the result of separation test on MEAs manufactured under the following conditions.

(a) electrode-membrane bonding of plate pressing, 170° C., 25 kgf, 5 minutes (b) electrode-membrane bonding of roll pressing (110° C., 14 kgf, 0.2 m/min)→heat treatment (140° C., no pressure, 30 minutes)

(b) electrode-membrane bonding of roll pressing (110° C., 14 kgf, 0.2 m/min)→heat treatment (170° C., 5 kgf, 5 minutes)

As for an MEA manufactured through heat treatment of high-pressure pressing after the electrode-membrane bonding of roll pressing under the condition (c), it can be seen that the MEA has excellent interfacial adhesion at the same level as the MEA manufactured by electrode-membrane bonding of plate pressing under the condition (a).

When an MEA was manufactured under to condition (b), bonding was performed by roll pressing and heat treatment was performed at high temperature, but as can be seen the MEA has interfacial adhesion significantly weaker than that of the MEA manufactured under the condition (a).

Referring to FIG. 6, the electrode and the electrolyte membrane are not discriminated well because the electrode show black is applied on the electrolyte membrane in the cases (a) and (c), but in the case (b), it is possible to see that the electrolyte membrane is exposed because most of the electrode applied on the electrolyte is separated.

Accordingly, it can be seen that it is possible to achieve interfacial adhesion equivalent to that of the MEA manufactured by plate pressing, only when appropriate temperature, pressure, and time are satisfied in the heat treatment process, even when an MEA is manufactured through the process of performing the electrolyte-membrane bonding of the roll pressing and the process of performing heat treatment of high-temperature pressing.

In other words, it can be seen that the MEA (see (c) of FIG. 6) manufactured under the condition of preferable temperature, pressure, and time, the heat treatment showed interfacial adhesion equivalent to that of the MEA (see (a) of FIG. 6) manufactured by plate pressing, but the MEA (see (b) of FIG. 6) manufactured under the condition of relatively non-preferable temperature, pressure, and time, the heat treatment showed interfacial adhesion considerably weaker than that of the MEA (see (a) of FIG. 6) manufactured by plate pressing.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a membrane electrode assembly for a fuel cell, comprising:

a bonding process that bonds electrodes and an electrolyte membrane to form the membrane electrode assembly; and a heat treatment process presses the membrane electrode assembly after the bonding process at a given temperature, wherein several membrane electrode assemblies are vertically stacked and the interfacial adhesion between electrodes and an electrolyte membrane of each membrane electrode assembly is increased by simultaneously pressing the membrane electrode assemblies at a given temperature, in the heat treatment process, and wherein a protection paper is inserted in between a hot press and the membrane electrode assembly, and between each vertically stacked membrane electrode assembly of the vertically stacked membrane electrode assemblies, in the heat treatment process.

2. The method of claim 1, wherein the bonding process is a roll pressing process.

3. The method of claim 1, wherein membrane electrode assemblies are continuously manufactured by bonding release papers continuously coated with electrodes at regular intervals and an electrolyte membrane during the bonding process.

4. The method of claim 1, wherein as the protection paper, film made of any one selected from a group consisting of polyethylene terephthalate (PET), polyethylene (PE), polypropylene (PP), polyvinyl chloride (PVC), polyethylene naphthalate (PEN), polytetrafluoroethylene (PTFE), and glassy fiber is used.

5. The method of claim 1, wherein as the protection paper, film formed by coating film made of any one selected from a group consisting of polyethylene terephthalate (PET), polyethylene (PE), polypropylene (PP), polyvinyl chloride (PVC), polyethylene naphthalate (PEN), polytetrafluoroethylene (PTFE), and glassy fiber, with polytetrafluoroethylene (PTFE) or silicon is used.

6. The method of claim 1, wherein a membrane electrode assembly is pressed under pressure of about 0.5 $kg/cm^2$~500 $kgf/cm^2$ in the heat treatment process.

7. The method of claim 1, wherein a membrane electrode assembly is pressed under pressure of about 1 $kgf/cm^2$~100 $kgf/cm^2$ in the heat treatment process.

8. The method of claim 1, wherein a membrane electrode assembly is pressed at temperature of about 50° C.~300° C. in the heat treatment process.

9. The method of claim 1, wherein a membrane electrode assembly is pressed at temperature of about 150° C.~250° C. in the heat treatment process.

10. The method of claim 1, wherein a membrane electrode assembly is pressed for about 10~3000 seconds in the heat treatment process.

11. The method of claim 1, wherein a membrane electrode assembly is pressed for about 30~600 seconds in the heat treatment process.

12. The method of claim 1, wherein a membrane electrode assembly is pressed at temperature of about 50° C.~300° C. under pressure of about 0.5 $kgf/cm^2$~500 $kgf/cm^2$ for about 10~3000 seconds in the heat treatment process.

13. The method of claim 1, wherein a membrane electrode assembly is pressed at temperature of about 150° C.~250° C. under pressure of about 1 $kgf/cm^2$~100 $kgf/cm^2$ for about 30~600 seconds in the heat treatment process.

* * * * *